(12) United States Patent
Voisin et al.

(10) Patent No.: US 9,393,763 B2
(45) Date of Patent: Jul. 19, 2016

(54) HEAT-SEALABLE COMPOSITE POLYMERIC FILM

(75) Inventors: David Voisin, Midlothian, VA (US); Fenghua Deng, Richmond, VA (US)

(73) Assignee: DUPONT TEIJIN FILMS U.S. LIMITED PARTNERSHIP, Chester, VA (US)

( * ) Notice: Subject to any disclaimer, the term of this patent is extended or adjusted under 35 U.S.C. 154(b) by 1606 days.

(21) Appl. No.: 11/989,341

(22) PCT Filed: Jul. 13, 2006

(86) PCT No.: PCT/GB2006/002603
§ 371 (c)(1),
(2), (4) Date: Jan. 24, 2008

(87) PCT Pub. No.: WO2007/012805
PCT Pub. Date: Feb. 1, 2007

(65) Prior Publication Data
US 2009/0098375 A1 Apr. 16, 2009

(30) Foreign Application Priority Data
Jul. 26, 2005 (GB) .................................. 0515346.5

(51) Int. Cl.
*B32B 27/30* (2006.01)
*B32B 27/08* (2006.01)

(52) U.S. Cl.
CPC .................. *B32B 27/30* (2013.01); *B32B 27/08* (2013.01); *B32B 27/304* (2013.01); *B32B 27/306* (2013.01); *B32B 27/308* (2013.01); *Y10T 428/266* (2015.01); *Y10T 428/269* (2015.01); *Y10T 428/31797* (2015.04); *Y10T 428/31928* (2015.04)

(58) Field of Classification Search
CPC ...... B32B 27/08; B32B 27/30; B32B 27/304; B32B 27/306; B32B 27/308; Y10T 428/266; Y10T 428/269; Y10T 428/31797; Y10T 428/31928
See application file for complete search history.

(56) References Cited

U.S. PATENT DOCUMENTS

| 3,959,526 | A | | 5/1976 | Swerlick |
| 5,151,331 | A | | 9/1992 | Beeson et al. |
| 5,360,116 | A | * | 11/1994 | Schmiletzky ................. 206/531 |
| 5,578,372 | A | * | 11/1996 | Murakami .................... 428/336 |
| 5,803,248 | A | * | 9/1998 | Cox ........................ 206/213.1 |
| 6,004,660 | A | | 12/1999 | Topolski et al. |
| 6,042,930 | A | | 3/2000 | Kelch et al. |
| 6,082,566 | A | | 7/2000 | Yousif et al. |
| 6,673,406 | B2 | * | 1/2004 | Bekele .......................... 428/36.7 |
| 7,144,619 | B2 | * | 12/2006 | Ramchandra et al. ........ 428/212 |
| 2004/0016208 | A1 | * | 1/2004 | Mumpower et al. ........... 53/411 |
| 2005/0159549 | A1 | * | 7/2005 | Kendig et al. ................. 525/119 |
| 2006/0105186 | A1 | * | 5/2006 | Kendig ....................... 428/474.4 |

FOREIGN PATENT DOCUMENTS

| EP | 24059 | A | * | 2/1981 |
| EP | 504433 | A | * | 9/1992 |
| GB | 838708 | | | 6/1960 |
| GB | 1348660 | A | * | 3/1975 |
| GB | 2223446 | | | 4/1990 |
| JP | 63113532 | | | 5/1988 |

OTHER PUBLICATIONS

Gomez, Laura Fernández, "International Search Report"; Nov. 16, 2006, 12 pp; European Patent Office, Rijswijk, The Netherlands.

\* cited by examiner

*Primary Examiner* — Callie Shosho
*Assistant Examiner* — John Freeman
(74) *Attorney, Agent, or Firm* — RatnerPrestia

(57) ABSTRACT

A sealed container containing a foodstuff or beverage has a lid that includes a heat-sealable, composite film that includes a polymeric substrate layer having a first and second surface, a primer layer that includes PVdC disposed on the first surface, and a heat-sealable polymeric layer extrusion coated on the primer layer. The heat-sealable polymeric layer is 12 μm thick or less and includes a copolymer having repeating monomeric units of ethylene and at least a second type of repeating monomeric unit having the formula [—$CH_2C(R^1)(X)$—] wherein:
X is selected from —$COOR^2$ and —$OC(O)CH_3$;
$R^1$ =H or methyl; and
$R^2$ is H, $C_{1-10}$ alkyl or a counterion M.

26 Claims, No Drawings

HEAT-SEALABLE COMPOSITE POLYMERIC FILM

This application is the National Stage filing of PCT Application No. GB2006/002603, filed 13 Jul. 2006, and claims priority benefit of GB Application No. 0515346.5, filed 26 Jul. 2005, the entire disclosure of which is expressly incorporated by reference herein.

FIELD OF THE INVENTION

This invention relates to a composite polymeric film having increased inter-layer adhesion, and a process for its preparation. The invention further relates to the use of the composite polymeric film as heat-sealable peelable film for general packaging applications, and particularly as a cap-liner.

BACKGROUND OF THE INVENTION

Heat-sealable, peelable films have long been used in the packaging of foodstuffs and beverages in order to keep goods sealed and fresh in a container prior to the end-use by the consumer. Typically, heat-sealable peelable films are multi-layer films, in which a substrate layer provides the requisite strength, and one or more additional layer(s) provide the heat-sealable functionality. Examples of such so-called "sealant films" include composite films wherein the substrate layer comprises polyester (typically polyethylene terephthalate (PET)) onto which is extrusion-coated a heat-sealable layer. A problem with prior art multi-layer films is that the inter-layer adhesion of the composite film can be insufficient for the sealant film to be readily peeled off and removed from the container by the consumer. Thus, in the case of some prior art sealant films, all or part of the heat-seal layer can sometimes remain on the container when peeling the sealant film, which is typically referred to as adhesive failure. Accordingly, it would be desirable to increase the inter-layer adhesion and provide a "clean peel". Previous attempts to increase the inter-layer adhesion of composite films have involved the use of a "tie-layer" between the top and bottom layers of the multi-layer film. A tie-layer comprises a layer of adhesive resin which is coextruded with the heat-sealable layer onto the substrate layer using coextrusion-coating. However, even with the presence of conventional tie-layers, it has been found that the inter-layer adhesion between the substrate and the tie-layer and/or between the tie-layer and the heat-sealable layer decreases as the thicknesses of the tie-layer and heat-sealable layer decrease. For this reason, the prior art films typically required that the total thickness of the tie-layer and heat-sealable layer was relatively high, and such films are consequently relatively costly to manufacture because of the amount of polymer material used. The thickness of the tie-layer itself is typically at least 4 μm. The use of coextrusion-coating to apply the sealable layer and tie-layer also makes the manufacture of the film more complex and more expensive. It would be desirable to provide a composite heat-sealable film comprising a relatively lower amount of heat-sealable material without detriment to the heat-seal characteristics of the film. Such a film would be of general use in packaging applications in which a heat-sealable peelable film is required.

One such packaging application is the cap-liner. A cap-liner is a device sealed on the top of a bottle in order to preserve, and provide security to, the liquid stored inside the bottle and to avoid leaking. The cap-liner is peeled off the bottle prior to emptying the liquid stored inside. Various materials have been proposed as layers in cap-liners, including polyolefin and polyester film, and the cap-liners known in the art typically comprise multi-layer laminate films. The bottom part (i.e. the part in closest proximity to the bottle to be sealed) typically comprises a sealant film comprising a layer of heat-sealable material which is heat-sealed to the rim of the bottle. The upper part (i.e. the part most remote from the bottle to be sealed) of the cap-liner structure typically comprises a white film and a device to help the consumer remove the cap-liner from the bottle, for instance a layer of circular film which is folded in half and adhered only to one half of the uppermost surface area of the cap-liner. The upper part of the cap-liner is adhered to the sealant film, typically with an intermediate layer of aluminium foil. For the reasons described above, a heat-sealable peelable film which exhibited improved inter-layer adhesion but which used less heat-sealable polymeric material and which was therefore thinner would be of benefit in this application.

A further problem with conventional packaging materials is the range of substrates to which a given packaging material can be heat-sealed. Thus, with regard to cap-liners, the known cap-liners cannot normally be used over a range of bottle types. Typically, bottles and other substrates are made from polymeric materials such as polypropylene (PP), polystyrene (PS), polyethylene (PE) and polyester (such as polyethylene terephthalate (PET)) as well as glass. It would be desirable to provide a packaging, including cap-liners, which would adhere to a larger variety of substrate materials, both polar and non-polar materials, particularly polyester (particularly PET), polyolefin and glass, and particularly polyester (particularly PET) and glass. In the case of cap-liners, it would be desirable to provide a cap-liner which would adhere to a larger variety of bottles, particularly polyester (particularly PET), polyolefin (particularly PE, PP and PS) and glass, and particularly polyester (particularly PET) and glass.

It is an object of this invention to overcome one or more of the afore-mentioned problems.

SUMMARY OF THE INVENTION

According to the present invention, there is provided a heat-sealable, composite film comprising a polymeric substrate layer having a first and second surface, a primer layer disposed on the first surface of the substrate layer, and a heat-sealable polymeric layer disposed on the primer layer, wherein
(i) the polymeric material of the primer layer comprises poly(vinylidene chloride) (PVdC);
(ii) the thickness of the primer layer is in the range of 0.01 to 6 μm;
(iii) the heat-sealable polymeric layer comprises a copolymer comprising repeating monomeric units of ethylene [—$CH_2CH_2$—] and one or more types of repeating monomeric units derived from acrylic acid, methacrylic acid and vinyl acetate having the formula [—$CH_2C(R^1)(X)$—] wherein:
X is selected from —$COOR^2$ and —$OC(O)CH_3$;
$R^1$=H or methyl; and
$R^2$ is selected from H, $C_{1-10}$ alkyl and a counterion M; and
(iv) the thickness of the heat-sealable layer is 25 μm or less.

DETAILED DESCRIPTION OF THE INVENTION

The substrate, primer and heat-sealable layers as defined herein allow the manufacture of a flexible film having improved inter-layer adhesion between the thin heat-sealable layer and polymeric substrate, particularly when the heat-sealable layer is extrusion coated onto the substrate, and provide a composite heat-sealable peelable film suitable as a sealant film to polar and non-polar substrates.

Preferably, the composite film exhibits a heat-seal strength (at ambient temperatures) to itself of at least 300 g/25 mm, preferably at least 1000 g/25 mm, and more preferably at least 2000 g/25 mm.

Preferably, the composite film exhibits a heat-seal strength (at ambient temperatures, i.e. approx. 22° C.) to a PET substrate of at least 200 g/25 mm, and preferably at least 500 and more preferably at least 1000 g/25 mm. Reference herein to a PET substrate includes reference to CPET and APET/CPET substrates, the designations APET and CPET referring to amorphous and crystalline PET respectively, particularly wherein the APET layer is the layer uppermost and in contact with the sealant film and adjacent the goods to be packaged.

Preferably, the composite film exhibits a heat-seal strength (at ambient temperatures, i.e. approx. 22° C.) to a standard polypropylene (PP) substrate of at least 200 g/25 mm, and preferably at least 500 and more preferably at least 1000 g/25 mm.

Preferably, the composite film exhibits a heat-seal strength (at ambient temperatures, i.e. approx. 22° C.) to a standard polyethylene (PE) substrate of at least 200 g/25 mm, and preferably at least 500 and more preferably at least 1000 g/25 mm.

Preferably, the composite film exhibits a heat-seal strength (at ambient temperatures, i.e. approx. 22° C.) to a standard polystyrene (PS) substrate of at least 200 g/25 mm, and preferably at least 500 and more preferably at least 1000 g/25 mm.

Preferably, the composite film exhibits a heat-seal strength (at ambient temperatures, i.e. approx. 22° C.) to a standard untreated glass substrate of at least 200 g/25 mm, and preferably at least 500 and more preferably at least 1000 g/25 mm.

The substrate has a first and a second surface. The primer layer is disposed on the first surface of the substrate. The first surface is the surface of the substrate which is innermost when the film is used as a cap-liner, and faces the interior of the bottle.

The substrate is a self-supporting film or sheet by which is meant a film or sheet capable of independent existence in the absence of a supporting base. The substrate may be formed from any suitable film-forming thermoplastic polymeric material. Such materials include a homopolymer or copolymer of a 1-olefin, such as ethylene, propylene and but-1-ene, polystyrenes, polycarbonates, polyesters (including copolyesters), PVC, PVA, polyacrylates, celluloses and polyamides such as nylon (including nylon 6 and nylon 6,6). Preferably the substrate material is selected from polyolefins (particularly polypropylene, polyethylene and polystyrene), polyamides (particularly nylon) and polyesters. Particularly preferred is a polyester material, and particularly a synthetic linear polyester. The substrate is preferably uniaxially or biaxially oriented, preferably biaxially oriented.

Suitable polyesters include those derived from one or more dicarboxylic acids, such as terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid), and from one or more glycols, particularly an aliphatic or cycloaliphatic glycol, such as ethylene glycol, 1,3-propanediol, 1,4-butanediol, neopentyl glycol and 1,4-cyclohexanedimethanol. An aliphatic glycol is preferred. A preferred substrate polyester is selected from polyethylene terephthalate and polyethylene naphthalate. Polyethylene terephthalate (PET) is particularly preferred.

The substrate is suitably of a thickness from about 5 to about 350 μm, preferably from 9 to about 150 μm and particularly from about 12 to about 75 μm.

Formation of the substrate may be effected by conventional techniques well-known in the art. Conveniently, formation of the substrate is effected by extrusion, in accordance with the procedure described below. In general terms the process comprises the steps of extruding a layer of molten polymer, quenching the extrudate and orienting the quenched extrudate in at least one direction.

The substrate may be uniaxially oriented, but is preferably biaxially oriented by drawing in two mutually perpendicular directions in the plane of the film to achieve a satisfactory combination of mechanical and physical properties. Orientation may be effected by any process known in the art for producing an oriented film, for example a tubular or flat film process.

In the preferred flat film process, the substrate-forming polymer is extruded through a slot die and rapidly quenched upon a chilled casting drum to ensure that the polymer is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction.

Forward stretching of the extrudate is conveniently effected over a set of rotating rolls or between two pairs of nip rolls, transverse stretching then being effected in a stenter apparatus. Alternatively, the cast film may be stretched simultaneously in both the forward and transverse directions in a biaxial stenter. Stretching is effected to an extent determined by the nature of the polymer, for example polyethylene terephthalate is usually stretched so that the dimension of the oriented film is from 2 to 5, more preferably 2.5 to 4.5 times its original dimension in the or each direction of stretching. Typically, stretching is effected at temperatures in the range of 70 to 125° C. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the polyester but below the melting temperature thereof, to induce crystallisation of the polyester. In applications where film shrinkage is not of significant concern, the film may be heat set at relatively low temperatures or not at all. On the other hand, as the temperature at which the film is heat set is increased, the tear resistance of the film may change. Thus, the actual heat set temperature and time will vary depending on the composition of the film but should not be selected so as to substantially degrade the tear resistant properties of the film. Within these constraints, a heat set temperature of about 135° to 250° C. is generally desirable, as described in GB-A-838708.

Prior to the application of the primer layer onto the substrate, the exposed surface of the substrate may, if desired, be subjected to a chemical or physical surface-modifying treatment to improve the bond between the substrate surface and the subsequently applied layer. For example, the exposed surface of the substrate may be subjected to a high voltage electrical stress accompanied by corona discharge. Alternatively, the substrate may be pretreated with an agent known in the art to have a solvent or swelling action on the substrate, such as a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The primer layer composition comprises PVdC. Suitable PVdC compositions include Saran (Dow Chemicals). Suitable PVdC compositions are well-known in the art and are disclosed, for instance, in U.S. Pat. No. 5,151,331, U.S. Pat. No. 3,959,526, U.S. Pat. No. 6,004,660. Suitable PVdC compositions are copolymers of 65 to 96% by weight of vinylidene chloride and 4 to 35% of one or more comonomers, particularly those containing an unsaturated carbon-carbon bond, such as vinyl chloride, acrylonitrile, methacrylonitrile, methyl methacrylate, itaconic acid or methyl acrylate. A suitable grade contains about 7 weight percent methacrylonitrile, 3 weight percent methyl methacrylate, and 0.3 weight percent itaconic acid comonomers.

In the manufacture of the composite film described herein, the substrate is coated with the primer composition. Coating may be effected using any suitable coating technique, including gravure roll coating (direct or indirect), forward or reverse roll coating, slot-die coating, dip coating, bead coating, extrusion-coating, melt-coating or electrostatic spray coating. Typically, the PVdC primer layer is applied to the substrate from solution, preferably using gravure coating techniques, the coated substrate then undergoing a drying step. Coating may be conducted "off-line", i.e. after any stretching and subsequent heat-setting employed during manufacture of the substrate, or "in-line", i.e. wherein the coating step takes place before, during or between any stretching operation(s) employed. Preferably, an in-line coating technique is used.

The total thickness of the primer layer is from about 0.01 to about 6 µm, preferably at least 0.02 µm, preferably at least 0.1 µm, and preferably no more than 4 µm. In a preferred embodiment, the primer layer thickness is from about 0.1 to about 6 µm, preferably from about 0.2 to about 4 µm.

The polymeric material of the heat-sealable layer should soften to a sufficient extent that its viscosity becomes low enough to allow adequate wetting for it to adhere to the surface to which it is being bonded. The heat-sealable polymeric material comprises a copolymer comprising repeating monomeric units of ethylene [—CH$_2$CH$_2$—] and one or more types of repeating monomeric units derived from acrylic acid, methacrylic acid and vinyl acetate having the formula [—CH$_2$C(R$^1$)(X)—] wherein:

X is selected from —COOR$^2$ and —OC(O)CH$_3$;
R$^1$=H or methyl; and
R$^2$ is selected from H, C$_{1-10}$ alkyl and a counterion M.

Where R$^2$ is selected from C$_{1-10}$ alkyl, preferably R$^2$ is selected from C$_{1-6}$ alkyl and preferably from methyl, ethyl, n-propyl, isopropyl, n-butyl, isobutyl, pentyl and hexyl, more preferably from methyl, ethyl, n-propyl, isopropyl, n-butyl and isobutyl.

Preferably the counterion M is selected from mono- and di-valent metallic counterions, and preferably from Na, Li, K, Rb, Cs, Zn, Be, Mg, Ca, Sr, Ba and Cd, and more preferably from Na, K, Zn, Ca and Mg, more preferably from Na and Zn.

In a first embodiment, hereinafter referred to as Embodiment A, the copolymer of the heat-sealable layer comprises repeating monomeric units of ethylene [—CH$_2$CH$_2$—] and further comprises a second type of repeating unit selected from vinyl acetate-derived repeating monomeric units of formula [—CH$_2$C(R$^1$)(OC(O)CH$_3$)—] wherein R$^1$=H or methyl, and preferably wherein R$^1$=H. Such copolymers are normally referred to as ethylene vinyl acetate (EVA) copolymers. Suitable ethylene vinyl acetate copolymers may be obtained from DuPont as Appeel™ or Elvax™0 resins. Typically, the content of the [—CH$_2$C(R$^1$)(OC(O)CH$_3$)—] repeating units in the copolymer is in the range of 2% to 40% w/w, and in one embodiment from 2% to 30% w/w.

In a second embodiment, hereinafter referred to as Embodiment B, the copolymer of the heat-sealable layer comprises repeating monomeric units of ethylene [—CH$_2$CH$_2$—] and further comprises a second type of repeating unit selected from acrylic and methacrylic acid-derived monomeric repeating units of formula [—CH$_2$C(R$^1$)(COOR$^2$)—], wherein R$^1$=H or methyl, and R$^2$ is selected from C$_{1-10}$ alkyl. Such copolymers are referred to as ethylene alkylacrylates (where R$^1$=H) and ethylene alkylmethacrylates (where R$^1$=methyl). Suitable ethylene alkyl(meth)acrylate copolymers may be obtained from DuPont as Elvaloy™ or Appeel™ resins. Typically they are butyl-, ethyl- or methyl-acrylate (EBA, EEA, and EMA) resins. Typically, the copolymers have an alkyl(meth)acrylate content in the range of 2% to 30% w/w, and typically 2% to 25% w/w.

In a third embodiment, hereinafter referred to as Embodiment C, the copolymer of the heat-sealable layer comprises repeating monomeric units of ethylene [—CH$_2$CH$_2$—] and further comprises a second type of repeating unit selected from acrylic and methacrylic acid-derived monomeric repeating units of formula [—CH$_2$C(R$^1$)(COOH)—], wherein R$^1$=H or methyl. Such copolymers are typically referred to as ethylene acrylic acid resins (where R$^1$=H) and ethylene methacrylic acid resins (where R$^1$=methyl). Suitable acid copolymers may be obtained from DuPont as Nucrel™ resins. Typical acid copolymers are ethylene methacrylic or acrylic acid resins wherein the methacrylic or acrylic acid content is typically in the range of 2 to 30%, more typically 5% to 30% w/w, and more typically 5% to 20% w/w.

In a fourth embodiment, hereinafter referred to as Embodiment D, the copolymer of the heat-sealable layer comprises repeating monomeric units of ethylene [—CH$_2$CH$_2$—] and further comprises a second type of repeating unit selected from acrylic and methacrylic acid-derived monomeric repeating units of formula [—CH$_2$C(R$^1$)(COOM)—], wherein R$^1$=H or methyl. Such copolymers are typically referred to as ionomers, and suitable materials may be obtained fom DuPont as Surlyn™ resins. Typically, the [—CH$_2$C(R$^1$)(COOM)—] repeating units are present in an amount in the range of 2 to 30%, more typically 5% to 30% w/w, and more typically 5% to 20% w/w. Ionomeric monomers are desirable for the manufacture of sealant films which are suitable for sealing to glass surfaces, and also for certain polymeric surfaces such as polyethylene.

In any of Embodiments A, B, C or D, the heat-sealable layer optionally further comprises one or more further type(s) of repeating monomeric unit [—CH$_2$C(R$^1$)(X)—] as defined above, i.e. further type(s) of repeating monomeric unit which is/are different from the second type of repeating monomeric unit. Typically, the heat-sealable layer may further comprise third and fourth types, and more typically only a third type, of repeating monomeric unit [—CH$_2$C(R$^1$)(X)—] as defined above. Where said third or fourth types of repeating monomeric unit are present, they may be present as the third or fourth comonomer in the copolymer of the heat-sealable layer. Alternatively, the third or fourth type of repeating unit may be present as comonomer(s) in a second copolymer comprising ethylene repeating units [—CH$_2$CH$_2$—], which is blended with the base copolymer of the heat-sealable layer, i.e. the copolymer comprising repeating monomeric units of ethylene [—CH$_2$CH$_2$—] and the second type of repeating monomeric unit referred to hereinabove. In a further embodiment, the third type of repeating unit is present as a comonomer in a second copolymer comprising ethylene repeating units [—$CH_2CH_2$—], and the fourth type of repeating unit is present as a comonomer in a third copolymer comprising ethylene repeating units [—$CH_2CH_2$—], the second and third copolymers being blended with the base copolymer of the heat-sealable layer. In a further embodiment, the third type of repeating unit is present along with the second type of repeating unit as a comonomer in the base copolymer of the heat-sealable layer, and the fourth type of repeating unit is present in a second copolymer comprising ethylene repeating units [—$CH_2CH_2$—] which is blended with the base copolymer.

Where third and subsequent types of repeating unit are present, they are present in relatively minor amounts. Thus, where third and subsequent types of repeating units are present as comonomer(s) in the base copolymer of the heat-sealable layer, the total amount of the third and subsequent types of repeating units is preferably in the range of 0.1% to 30% w/w, typically 0.4% to 25% w/w, more typically 0.4% to 20% w/w, and more typically 0.4% to 15% w/w. Equally, where third and subsequent types of repeating units are present as comonomer(s) in a second copolymer (or in second and subsequent copolymers) which is blended with the base copolymer of the heat-sealable layer, the total amount of the third and subsequent types of repeating units is preferably in the range of 0.1% to 30% w/w, typically 0.4% to 25% w/w, more typically 0.4% to 20% w/w, and more typically 0.4% to 15% w/w.

Thus, in Embodiment A, the heat-sealable layer may further comprise, preferably in an amount in the range of 0.1% to 30% w/w, one or more type(s) of acrylic acid or methacrylic acid-derived repeating monomeric units of formula [—$CH_2C(R^1)(COOR^2)$—] wherein $R^1$ and $R^2$ are as defined above, and more typically wherein $R^2$ is selected only from H and said counterion M. In one embodiment, the heat-sealable layer of Embodiment A comprises only a third type of repeating unit, wherein $R^2$ is selected either from H or from M. As described above, the or each additional repeating unit may be present as a comonomer in the copolymer of the heat-sealable layer, or may be present as comonomer(s) in a second (or third) copolymer comprising ethylene repeating units [—$CH_2CH_2$—], which is blended with the base copolymer of the heat-sealable layer.

Similarly, in Embodiment B, the heat-sealable layer may further comprise, preferably in an amount in the range of 0.1% to 30% w/w, vinyl acetate-derived repeating monomeric units of formula [—$CH_2C(R^1)(OC(O)CH_3)$—] and/or acrylic acid or methacrylic acid-derived repeating monomeric units of formula [—$CH_2C(R^1)(COOR^2)$—], wherein said $R^1$ groups are as defined above, and $R^2$ is selected from H and M. Typically, the heat-sealable layer of Embodiment B would further comprise acrylic acid or methacrylic acid-derived repeating monomeric units, rather than vinyl acetate-derived repeating monomeric units. In one embodiment, the heat-sealable layer of Embodiment B comprises only a third type of repeating unit, wherein $R^2$ is selected either from H or from M. As described above, the or each additional repeating unit may be present as a comonomer in the copolymer of the heat-sealable layer, or may be present as comonomer(s) in a second (or third) copolymer comprising ethylene repeating units [—$CH_2CH_2$—], which is blended with the base copolymer of the heat-sealable layer.

Similarly, for Embodiment C, the heat-sealable layer may further comprise, preferably in an amount in the range of 0.1% to 30% w/w, additional repeating unit(s) as described in respect of Embodiments, A, B and D. Equally, for Embodiment D, the heat-sealable layer may further comprise, preferably in an amount in the range of 0.1% to 30% w/w, additional repeating unit(s) as described in respect of Embodiments, A, B and C. The additional repeating unit(s) may be present as comonomer(s) in the base copolymer, or as comonomer(s) in a separate copolymer also comprising ethylene repeating units which is blended with the base copolymer, as described hereinabove.

In one embodiment, the acid groups of the second type of repeating unit in Embodiment C, i.e. the acrylic and methacrylic acid monomeric repeating units of formula [—$CH_2C(R^1)(COOH)$—], wherein $R^1$ is as defined above, may be partially neutralised with a counterion M. Thus, in this embodiment, a third type of repeating unit of formula [—$CH_2C(R^1)(COOM)$—], wherein $R^1$ and M are as defined above, is present. Typically, the total amount of [—$CH_2C(R^1)(COOH)$—] and [—$CH_2C(R^1)(COOM)$—] repeating units is in the range of 2% to 30% w/w. In one embodiment where the heat-sealable layer comprises the repeating units of Embodiments C and D, a fourth type of repeating unit is also present and is selected either from vinyl acetate-derived repeating monomeric units of formula [—$CH_2C(R^1)(OC(O)CH_3)$—] or from acrylic and methacrylic acid-derived monomeric repeating units of formula [—$CH_2C(R^1)(COOR^2)$—], wherein $R^1$ and $R^2$ are as defined above. In an alternative embodiment where the heat-sealable layer comprises the repeating Units of Embodiments C and D, the heat-sealable layer comprises neither vinyl acetate-derived repeating monomeric units of formula [—$CH_2C(R^1)(OC(O)CH_3)$—] nor acrylic and methacrylic acid-derived monomeric repeating units of formula [—$CH_2C(R^1)(COOR^2)$—], wherein $R^1$ and $R^2$ are as defined above.

References herein to comonomer contents in "% w/w" of the copolymer(s) of the heat-sealable layer are references to the weight of each comonomer fraction expressed as a percentage of the total weight of the copolymer(s).

Preferably, the copolymer of the heat-sealable layer is selected from embodiments A and B, and more preferably from ethylene vinyl acetate copolymers (EVA) and ethylene alkylmethacrylate copolymers (EMA), optionally comprising a third type of monomeric repeating unit, since such copolymers provide improved inter-layer adhesion.

The copolymer of the heat-sealable layer may be linear or branched, and preferably branched, which can improve the processability of the copolymer during coating, particularly extrusion coating.

Preferably the copolymers of the heat-sealable layer exhibit a density between 0.8 and 1.2 g/cm$^3$, preferably from 0.9 to 1.02 and preferably from 0.92 to 0.96.

Typical melt index for suitable heat sealable layer materials is in the range of 4 to 40, preferably in the range of 5 to 30.

The thickness of the heat-sealable layer is 25 µm or less, preferably 12 µm or less, and typically from about 2 to about 12 µm, more typically from about 5 to about 12 µm.

Formation of the heat-sealable layer may be effected by conventional techniques, and is conveniently effected by extrusion-coating the composition of the heat-sealable layer onto the primed substrate. Lamination of the primed substrate with a film composed of the heat-sealable material, using cold and hot rolls and conventional lamination equipment, may also be utilised in the manufacture of the composite film of the invention.

According to a further aspect of the present invention, there is provided a process for the manufacture of a heat-sealable, peelable composite film, said process comprising:
(a) providing a polymeric substrate having a first and second surface;
(b) providing on a first surface of the substrate a primer layer; and (c) providing a polymeric heat-sealable layer on the primer layer, particularly by extrusion coating, wherein (i) the polymeric material of the primer layer comprises poly(vinylidene chloride) (PVdC);

(ii) the thickness of the primer layer is in the range of 0.1 to 6 µm;

(iii) the heat-sealable polymeric layer comprises a copolymer comprising repeating monomeric units of ethylene $[—CH_2CH_2—]$ and one or more types of repeating monomeric units derived from acrylic acid, methacrylic acid and vinyl acetate having the formula $[—CH_2C(R^1)(X)—]$ wherein:

X is selected from $—COOR^2$ and $—OC(O)CH_3$;

$R^1$=H or methyl; and $R^2$ is selected from H, $C_{1-10}$ alkyl and a counterion M; and (iv) the thickness of the heat-sealable layer is 25 µm or less.

One or more of the layers of the polymeric film may conveniently contain any of the additives conventionally employed in the manufacture of polymeric films. Thus, agents such as cross-linking agents, dyes, pigments, voiding agents, lubricants, anti-oxidants, radical scavengers, UV absorbers, thermal stabilisers, anti-blocking agents, surface active agents, slip aids, optical brighteners, gloss improvers, prodegradents, viscosity modifiers and dispersion stabilisers may be incorporated as appropriate. In particular the composite film may comprise a particulate filler which may, for example, be a particulate inorganic filler or an incompatible resin filler or a mixture of two or more such fillers. Such fillers are well-known in the art.

Particulate inorganic fillers include conventional inorganic fillers, and particularly metal or metalloid oxides, such as alumina, silica (especially precipitated or diatomaceous silica and silica gels) and titania, calcined china clay and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the polymer layer. Preferred particulate inorganic fillers include titanium dioxide and silica.

The inorganic filler should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 µm, more preferably 0.05 to 1.5 µm, and particularly 0.15 to 1.2 µm. Preferably at least 90%, more preferably at least 95% by volume of the inorganic filler particles are within the range of the volume distributed median particle diameter ±0.8 µm, and particularly ±0.5 µm. Particle size of the filler particles may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile.

The components of a layer may be mixed together in a conventional manner. For example, by mixing with the monomeric reactants from which the layer polymer is derived, or the components may be mixed with the polymer or copolymer by tumble or dry blending or by compounding in an extruder, followed by cooling and, usually, comminution into granules or chips. Masterbatching technology may also be employed.

In one embodiment, the film described herein is optically clear, preferably having a % of scattered visible light (haze) of <20%, preferably <10%, and more preferably <5%, measured according to the standard ASTM D 1003. Preferably, the total light transmission (TLT) in the range of 400-800 nm is at least 75%, preferably at least 80%, and more preferably at least 85%, measured according to the standard ASTM D 1003. In this embodiment, filler is typically present in only small amounts, generally not exceeding 1.0% and preferably less than 0.5% by weight of the polymer of a given layer.

In an alternative embodiment, the film is opaque and filled to a greater degree, preferably exhibiting a Transmission Optical Density (TOD) (Sakura Densitometer; type PDA 65; transmission mode) in the range from 0.1 to 2.0, more preferably 0.2 to 1.5, more preferably from 0.25 to 1.25, more preferably from 0.35 to 0.75 and particularly 0.45 to 0.65. A film layer is conveniently rendered opaque by incorporation into the polymer blend of an effective amount of an opacifying agent. Suitable opacifying agents include an incompatible resin filler, a particulate inorganic filler or a mixture of two or more such fillers, as hereinbefore described. The amount of filler present in a given layer is preferably in the range from 1% to 30%, more preferably 3% to 20%, particularly 4% to 15%, and especially 5% to 10% by weight, based on the weight of the layer polymer. The surface of an opaque film preferably exhibits a whiteness index, measured as herein described, in the range from 60 to 120, more preferably 80 to 110, particularly 90 to 105, and especially 95 to 100 units.

In one embodiment, fillers such as micro-talc, may be added to a layer, typically the heat-sealable layer, providing a stress-whitening effect when the film is peeled from the contained to which it has been heat-sealed. For instance, in the case of a cap-liner heat-sealed to a bottle, a white ring appears when the film is peeled from the bottle. In this embodiment, filler is typically added at a level of less than 15% by weight of the heat-sealable layer, preferably from about 3% to about 10%.

In a preferred embodiment, one or more layers of the composite film, typically the heat-sealable layer, may comprise an anti-blocking agent. Any suitable anti-blocking agent known in the art may be used. Where present, such anti-blocking agents are typically added in amounts of 6% or less, and preferably from 0 to about 5% by weight of the layer. In a preferred embodiment, the composite film, and particularly the heat-sealable layer thereof, comprises a processing aid such as CONPOL™ (available from DuPont). Such processing aids normally comprise a plurality of agents (including a minor fraction of anti-blocking agent) targeted at minimising various problems commonly experienced in film manufacture.

Preferably, the composite film exhibits improved barrier properties when compared to conventional and existing packaging films. In one embodiment, the film provides a barrier to water vapour and/or oxygen, such that the water vapour transmission rate is in the range of 0.01 to 10 g/100 inches$^2$/day (preferably 0.01 to 1.0 g/100 inches$^2$/day, preferably 0.1 to 1 g/100 inches$^2$/day), and/or the oxygen transmission rate is in the range of 0.01 to 10 cm$^3$/100 inches$^2$/day/atm (preferably 0.01 to 1 cm$^3$/100 inches$^2$/day/atm, more preferably 0.1 to 1 cm$^3$/100 inches$^2$/day/atm).

The invention further provides a sealed container, particularly a bottle, containing a foodstuff or beverage and a lid, particularly a cap-liner, comprising a polymeric film as defined herein. The sealed container or bottle is produced by techniques well-known to those skilled in the art. Once the foodstuff or beverage to be packaged has been introduced into the container, the heat-sealable film lid or cap-liner is affixed using temperature and/or pressure using conventional techniques and equipment.

In a further aspect, the present invention provides the use of the composite film as described herein as packaging material for sealing a container, particularly as a sealant layer in a cap-liner for sealing a bottle.

In a further aspect, the present invention provides the use of the heat-sealable composite film as described herein for sealing foodstuffs or beverages in a container, particularly wherein the container is a bottle and the composite film is comprised in a cap-liner heat-sealed to said bottle.

In a further aspect, the present invention provides a method of sealing a container, said method comprising the step of providing a composite film as described herein, and heat-sealing the composite film to the container, particularly wherein the container is a bottle and the composite film is comprised in a cap-liner heat-sealed to said bottle.

In a further aspect, the present invention provides the use of a PVdC primer layer in a heat-sealable peelable composite film comprising a polymeric substrate layer and a heat-sealable polymeric layer, particularly wherein said composite film is suitable as or adapted for a sealant film for sealing a container, and particularly a composite film suitable as or adapted for a cap-liner for a bottle, for the purpose of improving the interlayer adhesion between the polymeric substrate layer and the heat-sealable layer, particularly an extrusion-coated heat-sealable layer, wherein (i) the heat-sealable polymeric layer comprises a copolymer comprising repeating monomeric units of ethylene [—$CH_2CH_2$—] and one or more types of repeating monomeric units derived from acrylic acid, methacrylic acid and vinyl acetate having the formula [—$CH_2C(R^1)(X)$—] wherein:
  X is selected from —$COOR^2$ and —$OC(O)CH_3$;
  $R^1$=H or methyl; and
  $R^2$ is selected from H, $C_{1-10}$ alkyl and a counterion M; and
(ii) the thickness of the heat-sealable layer is 25 μm or less.

The following test methods may be used to characterise the polymeric film:
(i) Clarity of the film may be evaluated by measuring total light transmission (TLT) and haze (% of scattered transmitted visible light) through the total thickness of the film using a Gardner XL 211 hazemeter in accordance with ASTM D-1003-61.
(ii) Heat-seal strength of the heat-sealable layer to itself is measured by positioning together and heating the heat-sealable layers of two film samples at 120° C. for one second under a pressure of 275 kPa (40 psi) on a Sentinel heat sealer (Model 12ASL/1; Sencorp Systems, Inc.). The sealed film is cooled to room temperature, and the sealed composite cut into 25 mm wide strips. The heat-seal strength is determined by measuring the force required under linear tension per unit width of seal to peel the layers of the film apart at a constant speed of 4.23 mm/second at an angle of 180° on a Suter testing machine (Alfred Suter Co.).
(iii) The heat-seal strength of the multi-layer film to a substrate is assessed using a procedure similar to procedure (ii) above, wherein the heat-sealable layer is positioned against the substrate (or a sample of said substrate having a width of 25 mm) to which the multilayer film is to be sealed. Unlike procedure (ii), the seal is effected at 150° C. for 0.5 second, except for glass substrates where the dwell time is increased to 1.0 second.
(iv) The interlayer adhesive strength is assessed using the heat-seal strength of the heat-sealable layer to itself in combination with the visual inspection of the heat-seal failure mode, in order to identify a primed base film for the target sealant layer. The composite film is heat-sealed to itself as described in test procedure (ii) above, and the composite films peeled away from each other at an angle of 180° using a Suter tester. The surface of the article is inspected by a microscope (under at least 20× magnification) to analyse the failure mode. Adhesive failure occurs when the composite film has completely or partially delaminated along the boundary between the heat-sealable layer and the primed substrate. Cohesive failure occurs when no sealant material is lifted off the primed base film. Cohesive failure is preferred and indicates adequate interlayer adhesion.
(v) Melt Index may be measured according to ASTM D1328 (190° C.; 2.16 kg).
(vi) Water vapour transmission rate is measured according to ASTM D3985.
(vii) Oxygen transmission rate is measured according to ASTM F1249.
(viii) Density is measured by ASTM D792.

The invention is further illustrated by the following examples. It will be appreciated that the examples are for illustrative purposes only and are not intended to limit the invention as described above. Modification of detail may be made without departing from the scope of the invention.

EXAMPLES

Example 1

A polymer composition comprising polyethylene terephthalate was melt-extruded and cast onto a cooled rotating drum and stretched in the direction of extrusion to approximately 3 times its original dimensions. The film was passed into a stenter oven at a temperature of 100° C. where the film was stretched in the sideways direction to approximately 3 times its original dimensions. The biaxially-stretched film was heat-set at a temperature of about 230° C. by conventional means. The total thickness of the final film was 25 μm.

A primer composition was prepared with the following composition by weight of solids:
PVdC (Saran F278; Dow Chemicals): 98%;
Filler (Microtalc; Ashland Chemical Co. USA): 1.2%;
Acid scavenger (Drapex 6.8; Crompton Corp. USA): 0.4%; and
Carnauba wax (Frank B. Ross Company, USA): 0.4%
The composition was coated as a 20% solids solution in THF and toluene onto the PET substrate (prepared as described above) by an off-line gravure coating technique, and the primed substrate then dried in an oven at 120° C. to provide a primer layer approximately 2 μm in thickness.

A polymer composition comprising ethylene vinyl acetate polymer (EVA; Elvax™ resin; DuPont) was applied to the primed substrate film by extrusion coating at 230° C. The extruder output was 16.5 kg/h. The film web speed was varied at 40 and 80 m/min to yield two composite film samples in which the thicknesses of the heat-sealable layers were 12 and 6 μm respectively.

Example 2

The procedure of Example 1 was repeated except that the heat-sealable layer was an EMA-based copolymer (Appeel™

20D745; DuPont) and comprised 2% Conpol™ slip/antiblocking agent (grade 20S2; DuPont). The extrusion temperature was 280° C. The heat-seal strengths of the composite films to various surfaces were then measured, the test method being in accordance with test method (iii) above. The results are shown in Table 1.

Example 3

The procedure of Example 2 was repeated except that the heat-sealable layer comprised an EMA-based copolymer (Appeel™ 20D745; DuPont), 10% Surlyn™ (grade 1702SBR; DuPont) and Conpol™ slip/antiblocking agent (grade 20S2; DuPont).

The heat-seal strengths of the composite films to various surfaces were then measured, the test method being generally in accordance with test method (iii) above. The results are shown in Table 1.

TABLE 1

| EXAMPLE | HS-layer thickness | Test surface & heat-seal strength (g/25 mm) | | | |
|---|---|---|---|---|---|
| | | Glass | CPET | PP | PE |
| Example 2 | 6 μm | 252 | 687 | 513 | 1075 |
| | 12 μm | 225 | 975 | 508 | 1558 |
| Example 3 | 6 μm | 602 | 642 | 458 | 915 |
| | 12 μm | 538 | 992 | 433 | 1267 |

Example 4

The procedure of Example 2 was repeated except that the base PET substrate was not primed. The effect of the PVdC primer on the interlayer adhesion strength is demonstrated by the data in Table 2.

TABLE 2

| EXAMPLES | Heat Seal Layer thickness | Heat Seal Strength (g/in) | Failure Mode |
|---|---|---|---|
| Example 2 | 12 μm | 1842 | Cohesive |
| Example 4 | 12 μm | 650 | Adhesive |

Example 5

The procedure of Example 1 was repeated using a nylon substrate layer. Good interlayer adhesion, relative to an unprimed control, was obtained.

Example 6

The procedure of Example 1 was repeated using a polypropylene substrate layer. Good interlayer adhesion, relative to an unprimed control, was obtained.

The invention claimed is:

1. A sealed container containing a foodstuff or beverage, said container comprising a lid comprising a heat-sealable, peelable composite film comprising a polyester substrate layer having a first and second surface, a primer layer comprising a polymeric material and disposed on and in direct contact with the first surface of the polyester substrate layer, and a heat-sealable polymeric layer extrusion coated on the primer layer, wherein (i) the polymeric material of the primer layer comprises poly(vinylidene chloride) (PVdC);
(ii) the thickness of the primer layer is in the range of 0.01 to 0.2 μm;
(iii) the polymeric material of the heat-sealable polymeric layer consists of a copolymer comprising repeating monomeric units of ethylene [—CH$_2$CH$_2$—] and at least a second type of repeating monomeric unit derived from acrylic acid, methacrylic acid and vinyl acetate having the formula [—CH$_2$C(R$^1$)(X)—] wherein:
X is selected from the group consisting of —COOR$^2$ and —OC(O)CH$_3$;
R$^1$=H or methyl; and
R$^2$ is selected from the group consisting of H, C$_{1-10}$ alkyl and a counterion M; and
wherein the heat-sealable polymeric layer contains only a single type of said copolymer;
(iv) the thickness of the heat-sealable layer is 12 μm or less; and
(v) the water vapour transmission rate of the heat-sealable, peelable composite film is in a range of 1g/100 inches$^2$/day to 10g/100 inches$^2$/day.

2. The sealed container according to claim 1 wherein the Second type of repeating monomeric unit is of the formula [—CH$_2$C(R$^1$)(OC(O)CH$_3$)—].

3. The sealed container according to claim 2 wherein the content of the second type of repeating monomeric units in the copolymer is in the range of 2% to 40% w/w.

4. The sealed container according to claim 2 wherein R$^1$=H.

5. The sealed container according to claim 2 wherein the copolymer of the heat-sealable polymeric layer comprises repeating monomeric units of ethylene [—CH$_2$CH$_2$—] and said second type of repeating monomeric unit, and further comprises one or more further type(s) of repeating monomeric unit [—CH$_2$C(R$^1$)(X)—] which is/are different from the second type of repeating monomeric unit.

6. The sealed container according to claim 5 wherein the copolymer of the heat-sealable polymeric layer comprises third and fourth types of repeating monomeric unit of formula [—CH$_2$C(R$^1$)(X)—].

7. The sealed container according to claim 5 wherein the total amount of said one or more further type(s) of repeating monomeric unit [—CH$_2$C(R$^1$)(X)—] in the heat-sealable polymeric layer is in the range of 0.1% to 30% w/w.

8. The sealed container according to claim 2 wherein the copolymer of the heat-sealable polymeric layer further comprises one or more type(s) of repeating units of formula [—CH$_2$C(R$^1$)(COOR$^2$)—] wherein R$^2$ is selected from the group consisting of H and M, in addition to the monomeric units of ethylene and the second type of repeating monomeric unit.

9. The sealed container according to claim 1 wherein the second type of repeating monomeric unit is of the formula [—CH$_2$C(R$^1$)(COOR$^2$)—].

10. The sealed container according to claim 9 wherein R$^2$ is selected from the group consisting of methyl, ethyl, n-propyl, isopropyl, n-butyl, isobutyl, pentyl and hexyl.

11. The sealed container according to claim 9 wherein R$^1$=H.

12. The sealed container according to claim 9 wherein the content of said second type of repeating monomeric unit is in the range of 2% to 30% w/w.

13. The sealed container according to claim 9 wherein the copolymer of the heat-sealable polymeric layer further comprises one or more type(s) of repeating units of formula [—CH$_2$C(R$^1$)(COOR$^2$)—] wherein R$^2$ is selected from the group consisting of H and M, in addition to the monomeric units of ethylene and the second type of repeating monomeric unit.

14. The sealed container according to claim 1 wherein the second type of repeating monomeric unit is of the formula [—CH$_2$C(R$^1$)(COOH)—].

15. The sealed container according to claim 14 wherein the content of said second type of repeating monomeric unit is in the range of 2% to 30% w/w.

16. The sealed container according to claim 1 wherein the second type of repeating monomeric unit is of the formula [—CH$_2$C(R$^1$)(COOM)—].

17. The sealed container according to claim 16 wherein M is selected from the group consisting of Na, Li, K, Rb, Cs, Zn, Be, Mg, Ca, Sr, Ba and Cd.

18. The sealed container according to claim 16 wherein M is selected from the group consisting of Na and Zn.

19. The sealed container according to claim 16 wherein the copolymer of the heat-sealable polymeric layer further comprises one or more type(s) of repeating units of formula [—CH$_2$C(R$^1$)(COOH)—], in addition to the monomeric units of ethylene and the second type of repeating monomeric unit.

20. The sealed container according to claim 19 wherein the copolymer of the heat-sealable polymeric layer further comprises repeating units of formula [—CH$_2$C(R$^1$)(OC(O)CH$_3$)—] or repeating units of formula [—CH$_2$C(R$^1$)(COOR$^2$)—], wherein R$^2$ is selected from C$_{1-10}$ alkyl, in addition to the monomeric units of ethylene and the second type of repeating monomeric unit.

21. The sealed container according to claim 16 wherein R$^1$ =H.

22. The sealed container according to claim 16 wherein the content of said second type of repeating monomeric unit is in the range of 2% to 30% w/w.

23. The sealed container according to claim 1 wherein the polyester substrate layer has a thickness of from 5 to 350μm.

24. The sealed container according to claim 1 wherein the polyester substrate layer has a thickness of 25μm or less.

25. A method of forming the sealed container of claim 1, said method comprising the step of providing the heat-sealable, peelable composite film and heat-sealing the heat-sealable composite film to the container.

26. A sealed container containing a foodstuff or beverage, said container comprising a lid comprising a heat-sealable, peelable composite film comprising a polyester substrate layer and a heat-sealable polymeric layer, with a PVdC primer layer disposed between and in direct contact with both the polyester substrate layer and the heat-sealable polymer layer, said PVdC primer layer having a thickness in the range from 0.01 to 0.2μm, wherein:
   (i) the polymeric material of the heat-sealable polymeric layer consists of a copolymer comprising repeating monomeric units of ethylene [—CH$_2$CH$_2$—] and one or more types of repeating monomeric units having the formula [—CH$_2$C(R$^1$)(X)—] wherein:
   X is selected from the group consisting of —COOR$^2$ and —OC(O)CH$_3$;
   R$^1$ =H or methyl; and
   R$^2$ is selected from the group consisting of H, C$_{1-10}$ alkyl and a counterion M; and
   wherein the heat-sealable polymeric layer contains only a single type of said copolymer;
   (ii) the thickness of the heat-sealable polymeric layer is 12 μm or less; and
   (iii) the water vapour transmission rate of the heat-sealable, peelable composite film is in a range of 1g/100 inches$^2$/day to 10g/100 inches$^2$/day.

\* \* \* \* \*